Oct. 17, 1961  A. H. GAEBEL  3,004,345
REGISTER RULE
Filed Sept. 13, 1960
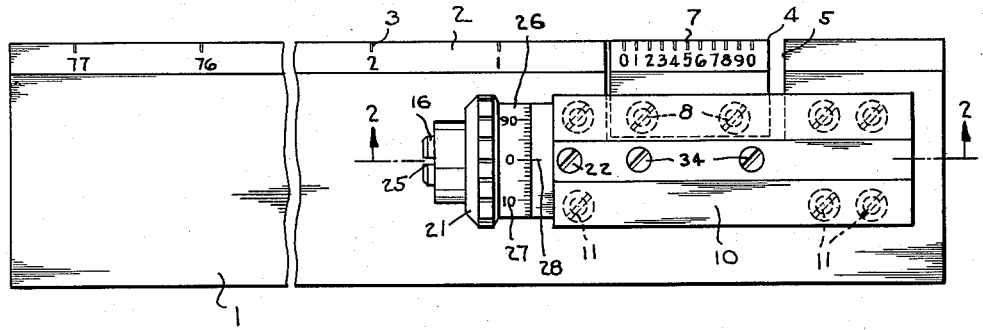
FIG. 1
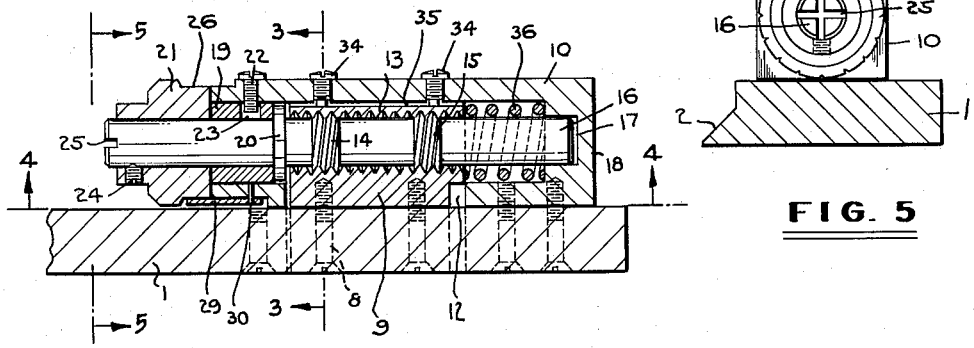
FIG. 2
FIG. 5
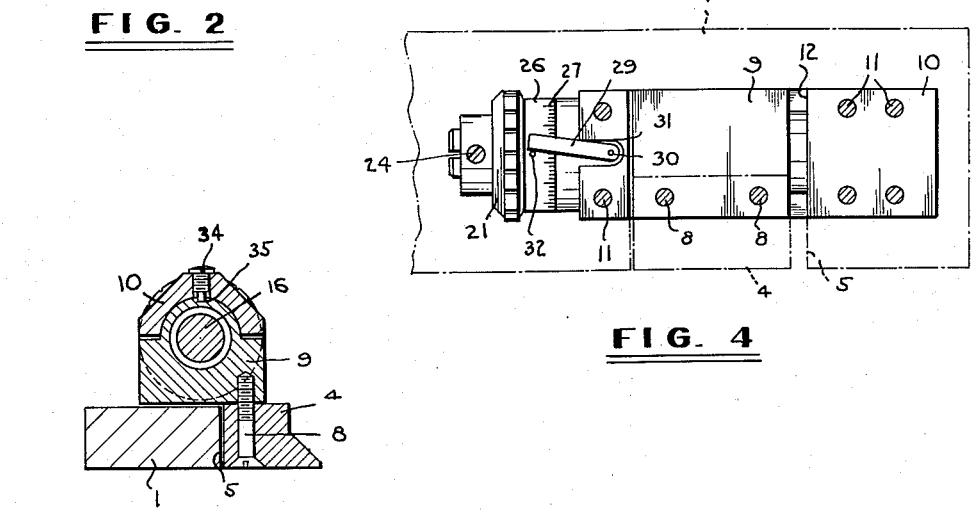
FIG. 4
FIG. 3
INVENTOR.
Arthur H. Gaebel
BY
Attorney 3,004,345
REGISTER RULE
Arthur H. Gaebel, 21 Cherry Ave., Larchmont, N.Y.
Filed Sept. 13, 1960, Ser. No. 55,622
4 Claims. (Cl. 33—107)

This invention relates to measuring rules and more particularly to a type by which a precise and accurate measurement is attained through the micrometric adjustment of parts of the same.

It is one of the objects of the invention to provide a measuring device of this character which shall be composed of relatively few and sturdy parts; which parts can be easily assembled and are long-lasting and which by their cooperation shall secure accuracy of measurement.

It is an object of the invention to provide a measuring device which can be easily read and which will insure accurate readings, and to provide a device of this kind in which the various parts are so housed and protected that damage to the device by rough handling and careless use will be prevented.

More particularly, the invention contemplates the provision of a scaled base member having a movable calibrated section of a housing mounted on the base member and containing a slidably adjustable sleeve to which the calibrated section is attached; of a shaft rotatably mounted within the sleeve and threadably engaged therewith so that manual rotative movement of the shaft will slidably move the sleeve and thus adjust the calibrated section attached to the same, and of a calibrated knob attached to the shaft and by which the shaft is rotated, and numerous other features to be described.

With these and other objects to be hereinafter set forth in view, I have devised the arrangement of parts to be described and more particularly pointed out in the claims appended hereto.

In the accompanying drawings, wherein an illustrative embodiment of the invention is disclosed, FIG. 1 is a top plan view of a measuring rule constructed according to the invention;

FIG. 2 is a sectional view, taken substantially on the line 2—2 of FIG. 1, looking in the direction of the arrows;

FIG. 3 is a sectional view, taken substantially on the line 3—3 of FIG. 2, looking in the direction of the arrows;

FIG. 4 is a sectional view, taken substantially on the line 4—4 of FIG. 2, looking in the direction of the arrows, and FIG. 5 is a sectional view, taken substantially on the line 5—5 of FIG. 2, looking in the direction of the arrows.

Referring to the drawing, 1 indicates generally the body or base member of the measuring rule. The same is preferably, although not necessarily, made of light metal such as aluminum and is provided with a beveled longitudinal edge 2, bearing graduations 3 indicating inches or other required spacings. At 4 is disclosed the slidable measuring element of the rule, the edge thereof being tapered or beveled to conform in shape to the beveled edge 2 of the body of the rule.

The slidable element 4 is positioned within a notch or cutout 5 provided in the body 1 and is mounted for slidable movement within said notch to the extent defined by the opposite end walls of the notch. Said slidable element 4 has its edge graduated or calibrated at 7 into ten equal sub-divisions spaced one-tenth of an inch apart or at other suitable distances as required for cooperation with the graduations shown at 3 on the edge 2 of the base member.

The slidable measuring element 4 is secured by means of screws 8 or other equivalent fastening means to a sleeve in the form of a nut 9 adjustably mounted for limited axial sliding movement within a housing or enclosure shown at 10. The housing 10 is secured to the base member 1 by screws 11. An aperture 12 is provided in the lower part of the housing to provide for the required sliding movement of the measuring element 4.

The sleeve or nut 9 is provided with internal threads 13 for its length and for threadable engagement with spaced groups 14 and 15 of threads provided on a shaft 16 mounted for manual rotative movement. The spaced groups of threads shown at 14 and 15, rather than a continuous thread, are used on the shaft 16 to reduce the friction between the threads on the shaft 16 and the internal threads 13 in the sleeve or nut 9. The shaft 16 extends axially through the housing 10 and passes through the nut or sleeve 9 as clearly shown in FIG. 2. A recess 17 is provided in the end wall 18 of the housing 10 to support one end of the shaft 16 and said end of the shaft is rotatively mounted therein.

Adjacent to its opposite end, the shaft 16 extends through a bushing 19 within which it is rotatable. The bushing 19 is confined between a collar 20 formed on the shaft 16 and a knob 21 fitted on the end part of the shaft that extends beyond the housing 10. The bushing is maintained against rotative movement by means of a set screw 22 entering recess 23 provided in the bushing.

The knob 21 is secured on the end portion of the shaft 16 by means of a set screw 24 and to assist in properly positioning the knob on the shaft, the exposed end of the shaft is slotted as shown at 25 for engagement by a screw driver or other suitable implement to either turn the shaft as required or hold it in a fixed position while accurately positioning the knob on it.

Included as a part of the knob 21 is a cylindrical portion 26 constituting a drum and which is suitably calibrated as shown at 27 for cooperation with a hair-line marking 28 provided on the top of the housing 10 adjacent to the calibrated portion 26.

To limit the rotative movement of the knob 21 in both of its rotative directions, a stop means, clearly shown in FIG. 4 is provided. The stop means includes a finger 29 having one end pivoted at 30 on the bottom of the housing 10, and within a recess 31. The shape of the recess 31 is such as to permit limited pivotal movement of the finger 29. This arrangement is such that when the knob is rotated in one direction its rotative movement in that direction will be halted by the contact of a pin 32 provided on and extending radially from the part 26 of the knob, with one edge of the finger 29. When the knob is rotated in the opposite direction, the pin 32 will contact with the opposite edge of the finger 29, the pivotal swing of the finger within the confines of the recess 31 always halting the rotative movements of the knob and the shaft on which it is fixed, at the same point.

It will be apparent from the construction described that the slidable measuring element 4 will be slidably moved back and forth as required within the confines of the notch 5 by the manual rotation of the shaft 16, said shaft by its threadable engagement with the sleeve or nut 9 causing the sleeve or nut and the attached slidable element 4 to be moved accordingly.

To accurately guide the sleeve or nut 9 in its axial adjustment and also to hold the same against any rotative tendency, screws 34 are provided, the same being threaded through the top wall of the housing 10 and having their tips or ends entering a longitudinal groove 35 provided in the top of the sleeve or nut 9. To absorb slack or lost motion, a compression coil spring 36 is provided and the same biases the sleeve or nut 9 toward the left, as viewed in FIG. 2. This spring is confined between the end wall 18 of the housing and one end of the sleeve or nut 9 and it encircles an end portion of the shaft 16.

The manner in which measurements are taken will, from the foregoing, be readily apparent. By placing the rule in the proper position relative to the distance to be measured, the measured distance can be read off on the scales 3 and 7. The distance which the movable member 4 is movable within the notch 5 is equal to one-tenth of an inch and one complete revolution of the knob 21 causes the member 4 to travel for its full distance. The scale 27 on the knob is divided into one hundred spacings, each of the spacings representing one thousandth of an inch which can be read off on the scale 27 when the distance to be measured is less than one-tenth of an inch.

While the device is indicated as being scaled for inches it will be apparent that it may be otherwise scaled without material change in its structural characteristics.

Having thus described a single embodiment of the invention, it is obvious that the same is not to be restricted thereto but is broad enough to cover all structures coming within the scope of the annexed claims.

What I claim is:

1. A measuring rule comprising, a base member having a graduated edge, the edge being provided with an aperture, a slidable measuring scale located in said aperture and movable therein, a housing mounted on the top of the base member, said housing containing a sleeve axially adjustable in the housing, said sleeve being attached to the measuring scale, the sleeve being internally threaded, a spring in the housing tending to bias the sleeve in one direction, a threaded shaft rotative within the housing and extending through the sleeve and having threads in engagement with the internal threads in the sleeve, the shaft having an end extending beyond the housing and a calibrated knob provided a said end of shaft, said knob provided with a radially-extending stop in, and a pivoted finger on the bottom of the housing, and stop means for limiting the pivotal movements of the finger and cause it to halt rotative movements of the knob at the same point after the rotative movement of the knob in either direction.

2. A measuring rule comprising, a base member having a graduated and beveled edge, said edge being provided with an aperture, a sliding measuring scale located in said aperture and movable therein within the limits of the aperture, a housing mounted on the top of the base member, said housing containing a nut axially adjustable in the housing, said nut being attached to the measuring scale, the nut being internally threaded, a spring in the housing tending to bias the nut in one direction, a threaded shaft rotative within the housing and around which the spring is positioned, said shaft being provided with threads in spaced groups and in engagement with the internal threads in the nut, the shaft having an end extending beyond the housing, a calibrated knob provided on said end of the shaft, and means for halting the rotative movement of the knob at a definite point when the knob is moved in either direction.

3. A measuring rule comprising, a base member having a graduated edge, a movable scale measuring element forming a part of said edge, a housing mounted on top of the base member, a shaft in the housing extending parallel to the graduated edge, the shaft being externally threaded, a sleeve mounted for non-rotative and limited axial adjustment within the housing and encircling the shaft, the sleeve having internal threads engaging those on the shaft whereby the sleeve is axially moved by the rotative movement of the shaft, the scaled measuring element being attached to the sleeve, spring means in the housing tending to bias the sleeve in one direction, the shaft having one end extending beyond the housing and having a calibrated knob secured on said end externally of the housing, said housing having an end wall in which the shaft is rotatively mounted, a bushing in the housing adjacent to the opposite end of the shaft and within which the shaft is rotative, and stop means including a pivoted element on the housing for limited rotative movements of the calibrated knob.

4. A measuring rule comprising, a flat base member having a graduated edge, said edge having a notch, a slidable scale member movable within the confines of the notch, a hollow housing mounted on the top of the base member, a non-rotative slidable sleeve mounted within the housing, said sleeve having internal threads, said sleeve being fastened to the scale member, an externally-threaded shaft extending through the sleeve and having its threads in engagement with the internal threads of the sleeve whereby rotative movement of the shaft causes sliding movement of the scale member, the shaft having its opposite ends extending beyond the ends of the sleeve, one of said ends being rotatively mounted in a part of the housing and the other end extending beyond the housing, a knob carried on the latter end of the shaft externally of the housing, said knob having a cylindrical calibrated drum portion, and stop means carried by the housing for halting rotative movements of the knob in either of its two directions of rotative movement, a compression spring surrounding the end of the shaft that is rotative in the part of the housing, which spring biases the sleeve in a direction away from said end of the shaft, the housing having a recess on its bottom, the stop means including a finger pivotal in said recess and having its pivotal movements limited by the confines of said recess, and a radial pin on the knob for contact with one or the other of the edges of said finger.

References Cited in the file of this patent

UNITED STATES PATENTS

| | | |
|---|---|---|
| 1,005,883 | Roch | Oct. 17, 1911 |
| 1,648,936 | De Bus | Nov. 15, 1927 |
| 2,554,099 | Ermold | May 22, 1951 |
| 2,658,280 | Olney | Nov. 10, 1953 |